(12) United States Patent
Gadangi et al.

(10) Patent No.: US 6,219,772 B1
(45) Date of Patent: Apr. 17, 2001

(54) METHOD FOR EFFICIENT MEMORY ALLOCATION OF SMALL DATA BLOCKS

(75) Inventors: Ashok Kumar Gadangi, Petaluma; Davis Cooper Augustine, Jr., San Rafael; Kirk Ray Saathoff, Novato, all of CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/132,204

(22) Filed: Aug. 11, 1998

(51) Int. Cl.[7] .................................................. G06F 12/00

(52) U.S. Cl. .................................................. 711/170

(58) Field of Search .................................... 711/170, 173

(56) References Cited

U.S. PATENT DOCUMENTS 5,420,999 * 5/1995 Mundy ................................. 711/173
5,561,785 * 10/1996 Blandy et al. ...................... 711/170

* cited by examiner

*Primary Examiner*—David L. Robertson
(74) *Attorney, Agent, or Firm*—Gates & Cooper LLP (57) ABSTRACT

A technique for efficient small block memory allocation in processors. One or more segments are allocated in the memory, wherein each segment is comprised of a plurality of data pages. A same size pool is created for a specified block size and one or more of the data pages are assigned to the same size pool, wherein the assigned data page is subdivided into a plurality of free blocks of the specified block size. A request for memory of the specified block size is satisfied by accessing the data page assigned to the same size pool and allocating one or more of the free blocks of the data page to the request.

52 Claims, 4 Drawing Sheets

METHOD FOR EFFICIENT MEMORY ALLOCATION OF SMALL DATA BLOCKS

BACKGROUND OF THE INVENTION

1. Field of the Invention

This invention relates in general to efficient small block memory allocation for computer programs.

2. Description of Related Art

Operating systems provide functions that are used by application programs for the allocation and de-allocation of memory. Typically, an application program reserves a region of virtual memory that it commits as necessary to store data structures and their actual contents. If the data structures are dynamic and continue to grow in size, the application program can commit additional memory from the reserved region.

These functions must be generalized in such a way that they provide the best performance for a wide variety of application programs. As a result, the functions are not optimized to provide the best performance, for example, for requests to allocate small blocks of memory. Thus, there is a need in the art for improved techniques for the allocation and de-allocation of memory, especially when the requested blocks are small.

SUMMARY OF THE INVENTION

To overcome the limitations in the prior art described above, and to overcome other limitations that will become apparent upon reading and understanding the present specification, the present invention discloses a method, apparatus and article of manufacture for efficient small block memory allocation. One or more segments are allocated in the memory, wherein each segment is comprised of a plurality of data pages. A same size pool is created for a specified block size and one or more of the data pages are assigned to the same size pool, wherein each assigned data page is subdivided into a plurality of free blocks of the specified block size. A request for memory of the specified block size is satisfied by accessing the data page assigned to the same size pool and allocating one or more of the free blocks of the data page to the request.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Overview

The present invention comprises logic, data structures, and data that make it possible to allocate small blocks of memory faster and with less memory wastage than with prior art techniques. Also, the total memory used will grow and shrink closely in step with the actual amount of memory allocated.

Hardware Environment

Figure 1:
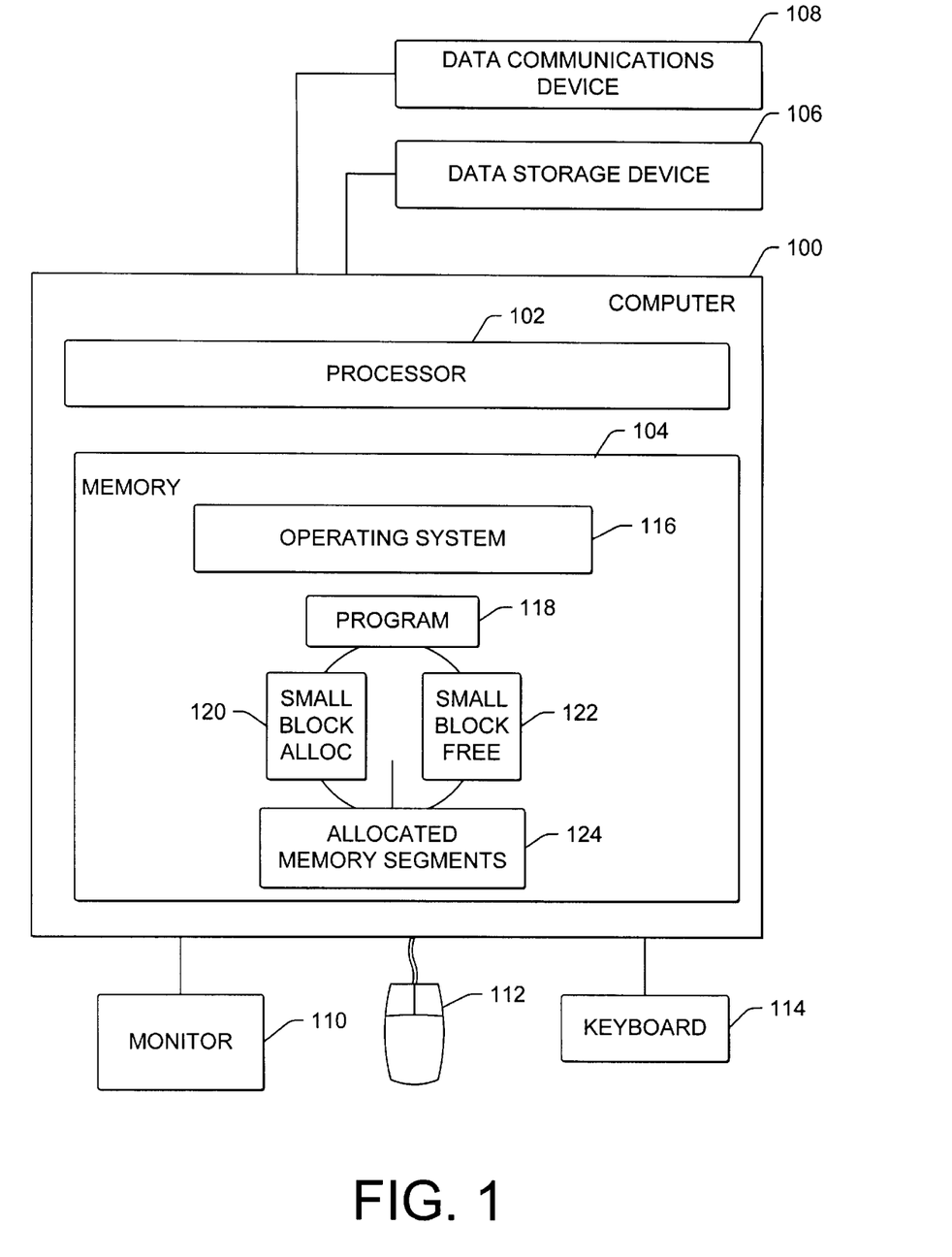
FIG. 1 is a block diagram that illustrates an exemplary computer hardware environment that could be used with the present invention.

FIG. 1 is an exemplary hardware environment used to implement the preferred embodiment of the invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112, and keyboard 114. It is envisioned that attached to the computer 100 may be other devices such as read only memory (ROM), a video card, bus interface, printers, etc. Further, the computer 100 usually operates under the control of an operating system (OS) 116, such as WINDOWS (NT, 95, 3.1), OS/2, UNIX, etc. The present invention is usually implemented or performed using a computer program 118, a SmallBlockAlloc function 120, a SmallBlockFree function 122, and one or more allocated memory segments 124.

The computer program 118, SmallBlockAlloc function 120, SmallBlockFree function 122, and allocated memory segments 124 are comprised of instructions, data structures, and/or data which, when read, interpreted, and/or executed by the computer 100, causes the computer 100 to perform the steps necessary to implement and/or use the present invention, as described in more detail below. Generally, the computer program 118, SmallBlockAlloc function 120, SmallBlockFree function 122, and allocated memory segments 124 are embodied in and/or readable from a device, carrier, or media, such as memory 102, data storage device 106, and/or remote devices (not shown) connected to the computer 100 via the data communications device 108. Under control of the operating system 116, the computer program 118, SmallBlockAlloc function 120, SmallBlock-Free function 122, and allocated memory segments 124 may be loaded from the memory 102, data storage devices 106, and/or remote devices into the memory 102 of the computer 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs accessible from any device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Data Structures

Figure 2:
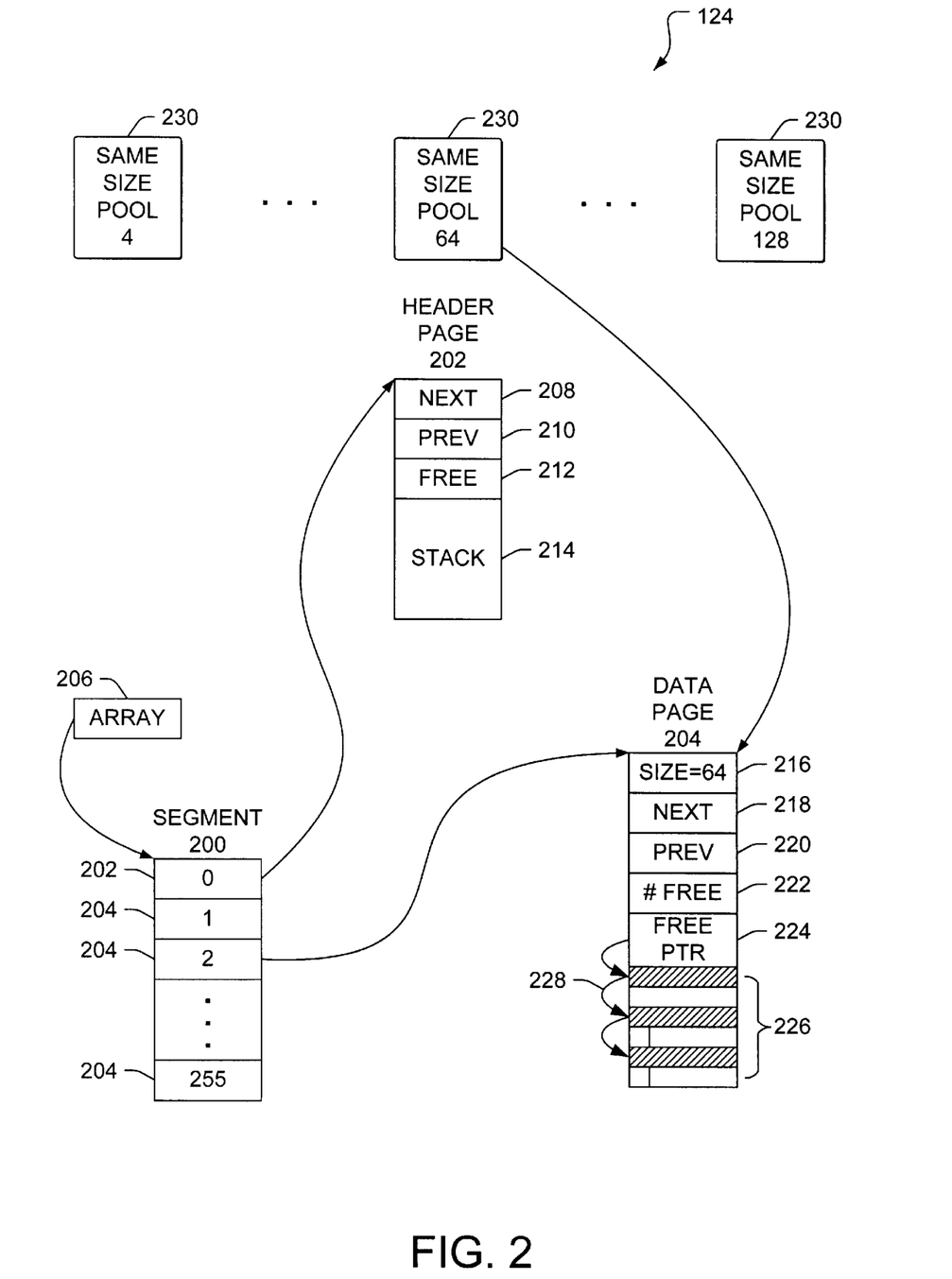
FIG. 2 is a block diagram that illustrates an exemplary set of data structures that could be used with the present invention.

FIG. 2 is a block diagram that illustrates the data structures used in the present invention. Memory 104 is allocated in 1 megabyte segments 200 from virtual memory, wherein each segment 200 resides on a 1 megabyte address boundary, each segment 200 is comprised of 1 header page 202 and 255 data pages 204, and each of the pages 202 and 204 is 4 kilobytes in size.

An array 206 of bits indicates whether each of the segments 200 belongs to SmallBlockAlloc 120 and SmallBlockFree 122. This array 206 is crucial, because without it there would be no way of knowing whether a pointer of a block being freed was allocated by SmallBlockAlloc 120. The next smaller 1 megabyte boundary identifies the segment 200 of a given block pointer, while the next smaller 4 kilobyte boundary identifies the start of the page 202 or 204 containing the block.

Each header page 202 includes a next pointer 208 and previous pointer 210 to create a linked list of all segments 200 having one or more free data pages 204. In addition, the header page 202 includes a pointer 212 to a stack 214 of pointers to free data pages 204 in the segment 200.

Each data page 204 includes a block size indicator 216 for the page 204. The data page 204 also includes a next pointer 218 and previous pointer 220 to create a linked list of data pages 204 in this or other segments 200 having free blocks of the same size 216, wherein the linked list is "owned" (and pointed to) by a SameSizePool object 230. Each data page 204 includes a count 222 and a pointer 224 to a linked list of free blocks 226 "owned" (and pointed to) by the data page 204. Each free block 226 includes next pointers 228 to create the linked list of free blocks 226 within the data page 204.

Operation

Memory 104 is acquired by the program 118, through calls to SmallBlockAlloc 120, in 1 megabyte segments 200, wherein each segment 200 starts on a 1 megabyte address boundary. When a segment 200 is allocated, only the header page 202 is committed. All the uncommitted data pages 204 are listed in the free page stack 214 in the header page 202 and are left in the stack 214 until they are committed to a SameSizePool 230.

In the preferred embodiment, requests for blocks 226 of size 128 bytes or smaller are handled by SmallBlockAlloc 120; any larger requests are diverted to the standard memory allocation functions in the C library. Of course, those skilled in the art will recognize that any size limits could be used with the present invention. The size of the block 226 determines the amount of memory wasted in each page 204, and the preferred embodiment starts wasting more memory than the Windows NT 4.0 standard C library around a block 226 size of 128 bytes.

In the preferred embodiment, requests to SmallBlockAlloc 120 have their size (in bytes) rounded off by a specified rounding factor, e.g., 4 bytes. Of course, those skilled in the art will recognize that any rounding factor or no rounding factor at all could be used with the present invention.

One SameSizePool 230 is created (as needed) for each of the possible block 226 sizes. All valid requests to SmallBlockAlloc 120 are serviced through the corresponding SameSizePool 230, wherein a free block 226 from one of the data pages 204 on the linked list owned by the SameSizePool 230 is committed to satisfy the request.

When there are no data pages 204 on the linked list owned by the SameSizePool 230, and thus no free blocks 226 available, a free data page 204 is retrieved from one of the segments 200 that have a free data page 204. If no free data pages 204 are available, a new segment 200 is allocated, the header page 202 is committed, all the uncommitted data pages 204 are listed in the free page stack 214 in the header page 202, and one of the uncommitted data pages 204 is retrieved from the segment 200.

The retrieved data page 204 is then initialized and committed, e.g., its size indicator 216 is set to the desired block 226 size, the data page 204 is subdivided into the correct size blocks 226, the blocks 226 are added to the linked list owned by the data page 204, and the data page 204 is added to the linked list owned by the SamePoolSize 230. Thereafter, the request can be satisfied using the newly committed data page 204.

Upon release of committed blocks 226, these steps are essentially reversed and the blocks 226 are returned to the linked list owned by the data page 204 and the data page 204 is returned to the linked list owned by the SameSizePool 230 (if it is not on the list already).

The address of the segment 200 that contains the block 226 is identified by its 1megabyte boundary address calculated from the address of the pointer to the block 226. This also identifies the header page 202, which is the first 4 kilobyte page within the segment 200. The 4 kilobyte data page 204 within the segment 200 that contains the block 226 is also identified from the pointer to the block 226.

When all the blocks 226 in a data page 204 have been released (i.e., uncommitted) from the SameSizePool 230 and returned to the linked list owned by the data page 204, the data page 204 itself may be released (i.e., uncommitted) and returned to the stack 214 owned by the header page 202. Note that at least one data page 204 is left on the linked list owned by each SameSizePool 230 to minimize the chance of frequent commits and un-commits of a data page 204 when a single block 226 is allocated and freed repeatedly.

When all the data pages 204 in a segment 200 have been released (i.e., uncommitted) from the SameSizePool 230 and returned to the stack 214 owned by the header page 202, the segment 200 itself may be released (i.e., uncommitted) from the linked list of segments 200 maintained by the header pages 202, removed from the array 206, and returned to the unallocated virtual memory of the operating system. Note that at least one segment 200 is left on the linked list of segments 200 and in the array 206 to minimize the chance of frequent commits and un-commits of a segment 200 when a single segment 200 is allocated and freed repeatedly.

Since the SameSizePool 230 and the next and previous pointers 218, 220 in the data pages 204 maintain the linked list of data pages 204 with free blocks 226 of a particular size, blocks 226 can quickly be acquired from the SameSizePool 230. Similarly, data pages 204 with no remaining uncommitted blocks 226 can be quickly removed from the SameSizePool 230.

Likewise, since the next and previous pointers 208, 210 in the header pages 202 maintain the linked list of all the segments 200 with free data pages 204, it is possible to quickly acquire a free data page 204 when requested and to quickly remove a segment 200 from the linked list when it has no uncommitted data pages 204.

SmallBlockAlloc Logic

Figure 3A:
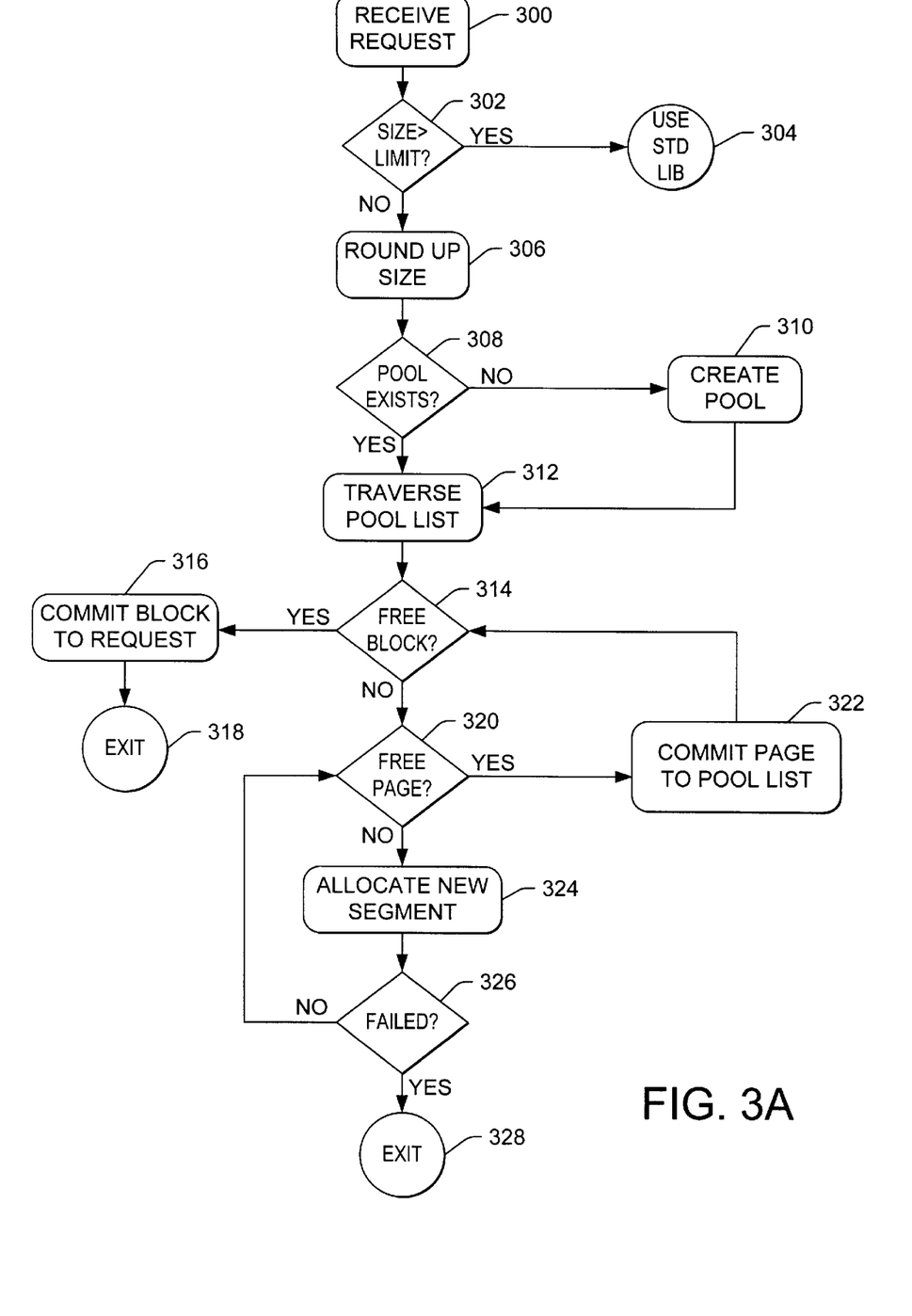
FIGS. 3A and 3B are flowcharts that illustrate the logic performed by a SmallBlockAlloc and SmallBlockFree functions according to the present invention.

FIG. 3A is a flowchart that illustrates the logic performed by SmallBlockAlloc 120 according to the present invention. Those skilled in the art will recognize that other logic could be substituted therefor without departing from the scope of the present invention.

Block 300 represents SmallBlockAlloc 120 receiving a request for a block of memory from the program 118.

Block 302 is a decision block that represents SmallBlockAlloc 120 determining whether the size of the request exceeds a predetermined limit or threshold. If so, control transfers to Block 304; otherwise, control transfers to Block 306.

Block 304 represents a large request being diverted to the standard C library.

Block 306 represents SmallBlockAlloc 120 rounding off the size of the request to a next larger multiple of a predetermined size, e.g., 4 bytes. Of course, those skilled in the art will recognize that other rounding factors or no rounding factors could be used without departing from the scope of the present invention.

Block 308 is a decision block that represents SmallBlockAlloc 120 determining whether a SameSizePool 230 exists for the size of the request. If not, control transfers to Block 310; otherwise, control transfers to Block 312.

Block 310 represents SmallBlockAlloc 120 creating a SameSizePool 230 for the desired block sizes.

Block 312 represents SmallBlockAlloc 120 traversing the linked list owned by the SameSizePool 230 to determine whether there is a free block 226 available for the request.

Block 314 is a decision block that represents SmallBlockAlloc 120 determining whether there is a free block 226 available on the linked list owned by the SameSizePool 230. If so, control transfers to Block 316; otherwise, control transfers to Block 320.

Block 316 represents SmallBlockAlloc 120 committing a free block 226 from the SameSizePool 230 to the request. If the block 226 is the last free block 226 in the data page 204, then Block 316 also represents the data page 204 being removed from the linked list owned by the Same Size Pool 230. Thereafter, control transfers to block 318, which represents the SmallBlockAlloc 120 satisfying the request and then exiting or terminating the logic.

Block 320 is a decision block that represents SmallBlockAlloc 120 determining whether there is a free data page 204 in any of the stacks 214 owned by the various header pages 202 of the segments 200 on the linked list of segments maintained by the header pages 202. If so, control transfers to Block 322; otherwise, control transfers to Block 324.

Block 322 represents SmallBlockAlloc 120 committing a free data page 204 to the SameSizePool 230 and initializing the data page 204. If the data page 204 is the last free data page 204 in the segment 200, then Block 322 also represents the segment 200 being removed from the linked list of segments 200 maintained by the header pages 202. Thereafter, control transfers to Block 314.

Block 324 represents SmallBlockAlloc 120 allocating a new segment 200 on a 1 megabyte address boundary and initializing all of the free data pages 204 from that segment 200. Thereafter, control transfers to block 326.

Block 326 is a decision block that represents SmallBlockAlloc 120 determining whether the allocation of the new segment 200 failed. If so, control transfers to Block 328; otherwise, control transfers to Block 320.

Block 328 represents the SmallBlockAlloc 120 exiting or terminating its attempt to satisfy the request.

SmallBlockFree Logic

Figure 3B:
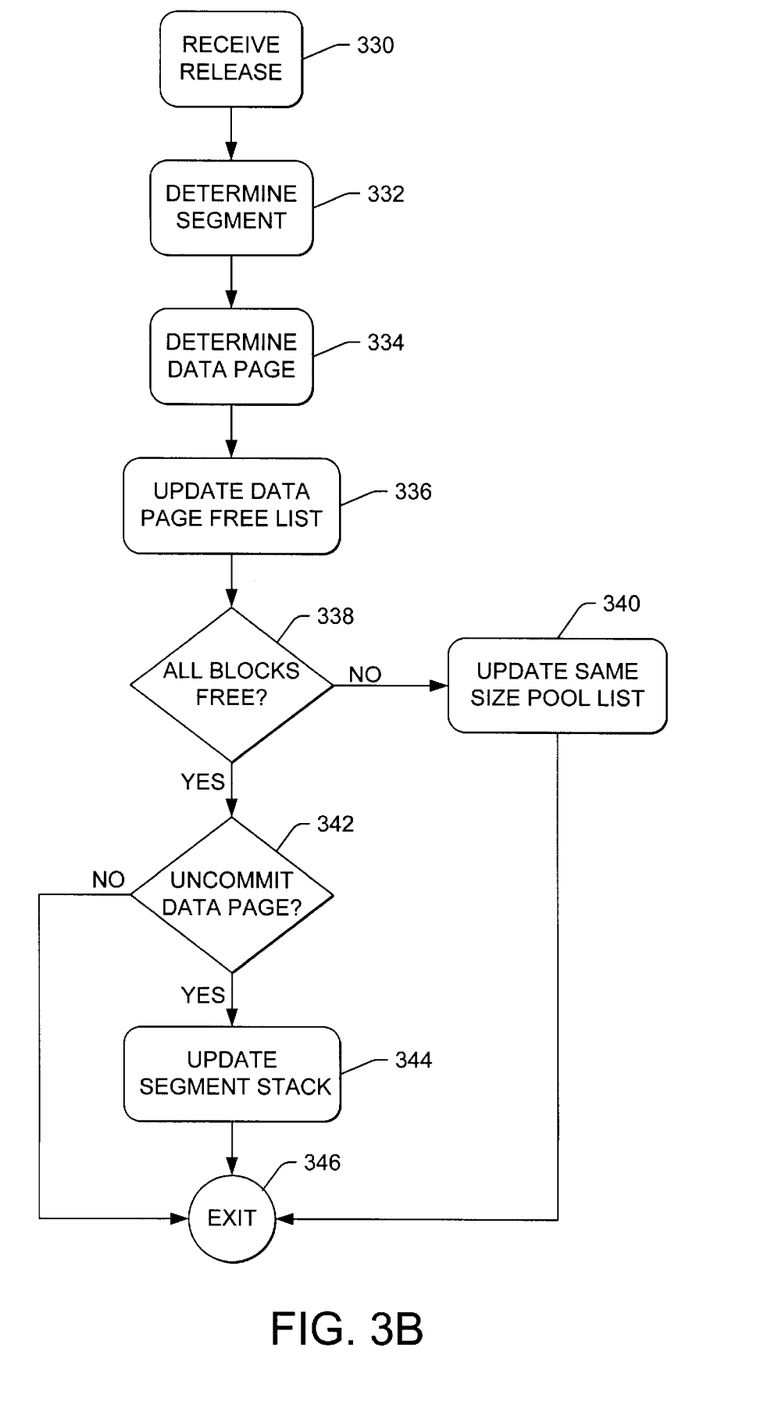

FIG. 3B is a flowchart that illustrates the logic performed by SmallBlockFree 122 according to the present invention. Those skilled in the art will recognize that other logic could be substituted therefor without departing from the scope of the present invention.

Block 330 represents SmallBlockFree 122 receiving a request to release a block 226 of memory 104 from the program 118.

Block 332 represents SmallBlockFree 122 determining the address of the segment 200 that contains the block 226 from the address of the pointer to the block 226. The segment 200 is identified by its 1 megabyte boundary address calculated from the address of the pointer to the block 226. This also identifies the header page 202, which is the first 4 kilobyte page within the segment 200.

Block 334 represents SmallBlockFree 122 determining the data page 204 that contains the block 226, by identifying the 4 kilobyte page within the segment 200 that contains the block 226.

Block 336 represents SmallBlockFree 122 updating the linked list of free blocks 226 owned by the data page 204.

Block 338 is a decision block that represents SmallBlockFree 122 determining whether all blocks 226 in the data page 204 are uncommitted. If not, control transfers to Block 340; otherwise, control transfers to Block 342.

Block 340 represents SmallBlockFree 122 returning the data page 204 to the linked list owned by the SameSizePool 230 (if it is not on the list already). Thereafter, control transfers to Block 346.

Block 342 is a decision block that represents SmallBlockFree 122 determining whether the data page 204 should be uncommitted, since all the blocks 226 therein are uncommitted. If not, control transfers to Block 346; otherwise, control transfers to Block 344. Note that SmallBlockFree 122 leaves at least one data page 204 on the linked list owned by each SameSizePool 230 to minimize the chance of frequent commits and un-commits of a data page 204 when a single block 226 is allocated and freed repeatedly.

Block 344 represents SmallBlockFree 122 uncommitting the data page 204 and returning it to the stack 214 of free data pages 204 owned by the header page 202 of the segment 200. If all of the data pages 204 in the segment 200 have been released, then Block 344 also represents SmallBlockFree 122 uncommitting the segment 200, i.e., releasing the segment 200 from the linked list of segments 200 maintained by the header pages 202, removing the segment 200 from the array 206, and returning the segment to the unallocated virtual memory of the operating system. Note that at least one segment 200 is left on the linked list of segments 200 and in the array 206 to minimize the chance of frequent commits and un-commits of a segment 200 when a single segment 200 is allocated and freed repeatedly.

Finally, Block 346 represents the termination of the logic.

Conclusion

This concludes the description of the preferred embodiment of the invention. In summary, the present invention comprises a method, apparatus, and article of manufacture for efficient small block memory allocation in processors. One or more segments are allocated in the memory, wherein each segment is comprised of a plurality of data pages. A same size pool is created for a specified block size and one or more of the data pages are assigned to the same size pool, wherein the assigned data page is subdivided into a plurality of free blocks of the specified block size. A request for memory of the specified block size is satisfied by accessing the data page assigned to the same size pool and allocating one or more of the free blocks of the data page to the request.

The following describe some alternative ways of accomplishing the present invention. For example, those skilled in the art will recognize that different computer programs, operating environments, and operating systems could be substituted for those described herein. In addition, those skilled in the art will recognize that the present invention could be used any type of computer, and need not be limited to a personal computer. Also, those skilled in the art will recognize that the present invention could be used with different types and implementations of memory allocation systems, without departing from the scope of the present invention. Further, those skilled in the art will recognize that alternate approaches to data structures and logic could be substituted for the approach described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for allocating blocks of memory in a processor, comprising the steps of:

allocating one or more segments in the memory, wherein each segment is comprised of a header page and a plurality of contiguous data pages, and the header page includes one or more pointers to a list of all segments having one or more free data pages and one or more pointers to free data pages within the segment;

creating a same size pool for a specified block size, wherein the same size pool maintains a list of data pages in one or more segments having free blocks of the specified block size;

assigning one or more of the data pages to the same size pool, wherein each assigned data page is subdivided into a plurality of contiguous blocks of the specified block size, and each assigned data page includes a block size indicator for the data page, one or more pointers to the list of data pages having free blocks of the specified block size, a count of free blocks within the data page, and one or more pointers to a list of the free blocks within the data page; and satisfying a request for memory of the specified block size by accessing one or more of the assigned data pages using the list maintained by the same size pool and allocating one or more of the free blocks within the assigned data pages to the request.

2. The method of claim 1 above, wherein each segment is allocated on a specified address boundary within the memory.

3. The method of claim 2 above, further comprising identifying a segment from an address of a block within the segment.

4. The method of claim 2 above, wherein each data page is allocated on a specified address boundary within the segment.

5. The method of claim 4 above, further comprising identifying a specific one of the data pages from an address of a block within the data page.

6. The method of claim 1 above, further comprising the steps of:

retrieving a free data page from the segment when there are no more free data pages in the same size pool; and assigning the retrieved data page to the same size pool.

7. The method of claim 1 above, further comprising the step of returning the data page to the list of free data pages within the segment when all of the blocks in the data page are free blocks.

8. The method of claim 1 above, wherein the satisfying step comprises the step of removing the free blocks from the list of free blocks within the data page when the free blocks are used to satisfy the request.

9. The method of claim 1 above, wherein the satisfying step comprises the step of removing the data page from the list of data pages owned by the same size pool when there are no free blocks within the data page.

10. The method of claim 1 above, further comprising the step of returning a released block to the list of free blocks within the data page.

11. The method of claim 10 above, further comprising the step of returning the data page to the list owned by the same size pool.

12. The method of claim 10 above, further comprising the step of leaving the data page on the list owned by the same size pool to minimize the chance of frequent commits and un-commits of a data page when a single block is allocated and released repeatedly.

13. The method of claim 1 above, further comprising the step of maintaining one or more data structures identifying whether a specific segment was allocated by the allocating step.

14. An apparatus for allocating blocks of memory in a processor, comprising:

means for allocating one or more segments in the memory, wherein each segment is comprised of a header page and a plurality of contiguous data pages, and the header page includes one or more pointers to a list of all segments having one or more free data pages and one or more pointers to free data pages within the segment;

means for creating a same size pool for a specified block size, wherein the same size pool maintains a list of data pages in one or more segments having free blocks of the specified block size;

means for assigning one or more of the data pages to the same size pool, wherein each assigned data page is subdivided into a plurality of contiguous blocks of the specified block size, and each assigned data page includes a block size indicator for the data page, one or more pointers to the list of data pages having free blocks of the specified block size, a count of free blocks within the data page, and one or more pointers to a list of the free blocks within the data page; and means for satisfying a request for memory of the specified block size by accessing one or more of the assigned data pages using the list maintained by the same size pool and for allocating one or more of the free blocks within the assigned data pages to the request.

15. The apparatus of claim 14 above, wherein each segment is allocated on a specified address boundary within the memory.

16. The apparatus of claim 15 above, further comprising means for identifying a segment from an address of a block within the segment.

17. The apparatus of claim 15 above, wherein each data page is allocated on a specified address boundary within the segment.

18. The apparatus of claim 17 above, further comprising means for identifying a specific one of the data pages from an address of a block within the data page.

19. The apparatus of claim 14 above, further comprising:

means for retrieving a free data page from the segment when there are no more free data pages in the same size pool; and means for assigning the retrieved data page to the same size pool.

20. The apparatus of claim 14 above, further comprising means for returning the data page to the list of free data pages within the segment when all of the blocks in the data page are free blocks.

21. The apparatus of claim 14 above, wherein the means for satisfying comprises means for removing the free blocks from the list of free blocks within the data page when the free blocks are used to satisfy the request.

22. The apparatus of claim 14 above, wherein the means for satisfying comprises means for removing the data page from the list of data pages owned by the same size pool when there are no free blocks within the data page.

23. The apparatus of claim 14 above, further comprising means for returning a released block to the list of free blocks within the data page.

24. The apparatus of claim 23 above, further comprising means for returning the data page to the list owned by the same size pool.

25. The apparatus of claim 23 above, further comprising means for leaving the data page on the list owned by the same size pool to minimize the chance of frequent commits and un-commits of a data page when a single block is allocated and released repeatedly.

26. The apparatus of claim 14 above, further comprising means for maintaining one or more data structures identifying whether a specific segment was allocated by the means for allocating.

27. A carrier embodying logic for allocating blocks of memory, the method comprising the steps of:
   allocating one or more segments in the memory, wherein each segment is comprised of a header page and a plurality of contiguous data pages, and the header page includes one or more pointers to a list of all segments having one or more free data pages and one or more pointers to free data pages within the segment;
   creating a same size pool for a specified block size, wherein the same size pool maintains a list of data pages in one or more segments having free blocks of the specified block size;
   assigning one or more of the data pages to the same size pool, wherein each assigned data page is subdivided into a plurality of contiguous blocks of the specified block size, and each assigned data page includes a block size indicator for the data page, one or more pointers to the list of data pages having free blocks of the specified block size, a count of free blocks within the data page, and one or more pointers to a list of the free blocks within the data page; and
   satisfying a request for memory of the specified block size by accessing one or more of the assigned data pages using the list maintained by the same size pool and allocating one or more of the free blocks within the assigned data pages to the request.

28. The carrier of claim 27 above, wherein each segment is allocated on a specified address boundary within the memory.

29. The carrier of claim 28 above, further comprising the step of identifying a segment from an address of a block within the segment.

30. The carrier of claim 28 above, wherein each data page is allocated on a specified address boundary within the segment.

31. The carrier of claim 30 above, further comprising the step of identifying a specific one of the data pages from an address of a block within the data page.

32. The carrier of claim 27 above, further comprising the steps of:
   retrieving a free data page from the segment when there are no more free data pages in the same size pool; and
   assigning the retrieved data page to the same size pool.

33. The carrier of claim 27 above, further comprising the step of returning the data page to the list of free data pages within the segment when all of the blocks in the data page are free blocks.

34. The carrier of claim 27 above, wherein the step of satisfying comprises the step of removing the free blocks from the list of free blocks within the data page when the free blocks are used to satisfy the request.

35. The carrier of claim 27 above, wherein the step of satisfying comprises the step of removing the data page from the list of data pages owned by the same size pool when there are no free blocks within the data page.

36. The carrier of claim 27 above, further comprising the step of returning a released block to the list of free blocks within the data page.

37. The carrier of claim 36 above, further comprising the step of returning the data page to the list owned by the same size pool.

38. The carrier of claim 36 above, further comprising the step of leaving the data page on the list owned by the same size pool to minimize the chance of frequent commits and un-commits of a data page when a single block is allocated and released repeatedly.

39. The carrier of claim 27 above, further comprising the step of maintaining one or more data structures identifying whether a specific segment was allocated by the allocating step.

40. A data structure stored in a memory for use in allocating blocks of the memory, comprising:
   one or more segments, wherein each segment is comprised of a header page and a plurality of contiguous data pages, and the header page includes one or more pointers to a list of all segments having one or more free data pages and one or more pointers to free data pages within the segment;
   a same size pool corresponding to a specified block size, wherein the same size pool maintains a list of data pages in one or more segments having free blocks of the specified block size; and
   one or more of the data pages assigned to the same size pool, wherein each assigned data page is subdivided into a plurality of contiguous blocks of the specified block size, and each assigned data page includes a block size indicator for the data page, one or more pointers to the list of data pages having free blocks of the specified block size, a count of free blocks within the data page, and one or more pointers to a list of the free blocks within the data page;
   wherein a request for memory of the specified block size is satisfied by accessing one or more of the assigned data pages using the list maintained by the same size pool and allocating one or more of the free blocks within the assigned data pages to the request.

41. The data structure of claim 40 above, wherein each segment is allocated on a specified address boundary within the memory.

42. The data structure of claim 41 above, wherein a segment is identified from an address of a block within the segment.

43. The data structure of claim 41 above, wherein each data page is allocated on a specified address boundary within the segment.

44. The data structure of claim 43 above, wherein a specific one of the data pages is identified from an address of a block within the data page.

45. The data structure of claim 40 above, wherein a free data page is retrieved from the segment when there are no more free data pages in the same size pool and the retrieved data page is assigned to the same size pool.

46. The data structure of claim 40 above, wherein the data page is returned to the list of free data pages within the segment when all of the blocks in the data page are free blocks.

47. The data structure of claim 40 above, wherein the free blocks are removed from the list of free blocks within the data page when the free blocks are used to satisfy the request.

48. The data structure of claim 40 above, wherein the data page is removed from the list of data pages owned by the same size pool when there are no free blocks within the data page.

49. The data structure of claim 40 above, wherein a released block is returned to the list of free blocks within the data page.

50. The data structure of claim 49 above, wherein the data page is returned to the list owned by the same size pool.

51. The data structure of claim 49 above, wherein the data page is left on the list owned by the same size pool to minimize the chance of frequent commits and un-commits of a data page when a single block is allocated and released repeatedly.

52. The data structure of claim 40 above, wherein one or more data structures are maintained identifying whether a specific segment was allocated.

* * * * *